United States Patent [19]

Bugar et al.

[11] Patent Number: 4,986,904

[45] Date of Patent: Jan. 22, 1991

[54] COLOR CODED DISPOSABLE FILTER HOLDER

[75] Inventors: Robert Bugar, Einbeck; Asok Chakraborty, Gottingen; Herbert Urlaub, Einbeck, all of Fed. Rep. of Germany

[73] Assignee: Schleicher & Schuell GmbH, Fed. Rep. of Germany

[21] Appl. No.: 443,532

[22] Filed: Nov. 30, 1989

[30] Foreign Application Priority Data

Dec. 20, 1988 [EP] European Pat. Off. ......... 88121316.9

[51] Int. Cl.⁵ ............................................. B01D 29/085
[52] U.S. Cl. ...................................... 210/94; 210/445; 210/447; 55/503; 55/510
[58] Field of Search ................ 210/445, 446, 447, 94, 210/451; 55/503, 510

[56] References Cited

U.S. PATENT DOCUMENTS

| | | | |
|---|---|---|---|
| 4,404,006 | 9/1983 | Williams et al. | 210/445 |
| 4,444,661 | 4/1984 | Jackson et al. | 210/447 |
| 4,601,820 | 7/1986 | Leason | 210/94 |
| 4,664,800 | 5/1987 | Rainis et al. | 210/445 |
| 4,874,513 | 10/1989 | Chakrabarty et al. | 210/445 |

FOREIGN PATENT DOCUMENTS 2837058  5/1985  Fed. Rep. of Germany .

Primary Examiner—Richard V. Fisher
Assistant Examiner—Wanda L. Millard
Attorney, Agent, or Firm—Lowe, Price, LeBlanc, Becker & Shur

[57] ABSTRACT

A disposable-filter holder comprises a shallow, box-shaped plastic housing of two pieces with intake and discharge stubs, a membrane-type filter being sandwiched between the two housing pieces which are joined together in a gas-tight and pressure-resistant manner. To reliably code the disposable-filter holder according to the filter characteristics, the disposable-filter holder comprises a colored coding plastic enveloping it in the outer radial zone. This color coding extends in at least one clearance in the first and/or in the second housing piece in geometrically locking manner and thereby does not project beyond the outer housing contour. The color coding only characterizes the disposable-filter holder and does not serve any sealing or locking function.

7 Claims, 1 Drawing Sheet

COLOR CODED DISPOSABLE FILTER HOLDER

Technical Field

The invention concerns a one-time use, i.e. a disposable-filter holder. In particular the invention relates to a disposable-filter holder for pressure filtration. Within the scope of the present invention, the terms "filter" and "pressure filtration" denote similar methods, for instance ultra-filtration, reverse osmosis and plain gravity filtration.

BACKGROUND ART

Disposable-filter holders in question as a rule comprise a plastic, two-piece housing of which the housing halves are connected to each either in pressure-resistant manner; they are flat and boxy. Inside such filter holders there is an essentially flat cavity divided by a filter, ordinarily a membrane filter, into an intake side pressure chamber and a discharge-side filtrate chamber. Typically the filter is secured against tearing by a filter support, for instance in the shape of a disk.

Single-use, i.e. disposable filter holders of this species are used wherever it is desired to filter preferably small and minute fluid volumes rapidly, reliably and in sterile manner as called for. As regards general lab work, there are many applications, illustratively preparing high-purity solutions of reaction. Another substantial application is medical and pharmacological lab work.

The plurality of these applications requires filter holders which for equal external dimensions of housing and filter merely differ relative to the filter characteristics, for instance the filter material or its pore size and sterility. The disposable filter holder in question being mass produced, there is a mandatory need for reliable, simple and differentiable characterization of the product. This differentiation illustratively can be carried out by individually characterizing either or both housing pieces, for instance by coloring the housing material or by applying a characterizing imprint. Disposable-filter holders so characterized however incur the drawback that if a change in type production takes place, either the mold must be changed or the entire injection machine, including the extruder, must be cleaned. Moreover vast storage of differently characterized housing pieces is required. Such steps significantly make such disposable-filter holders more expensive.

A solution to this problem is known from the German patent document No. 28 37 058 C3 in that disposable-filter holders of different types are manufactured with the same housing. The housing halves in this solution are identical for all given types and are joined—with inserted membrane filter—in geometrically locking or non-positive manner and then are sealed by injection molding in an appropriate sealing mold using a plastic sealing ring dyed to correspond to the filter characteristics and so as to be gas-tight and pressure-resistant.

However this known disposable-filter holder incurs the drawback that the dyed ring simultaneously acts to seal and lock on one hand and on the other to mark. This requires that this sealing ring on one hand be designed to engage around both the upper and lower pieces of the housing, while on the other hand it must be fairly thick. Accordingly the preparation of the sealing ring requires a comparatively large quantity of the dyed plastic of which the introduction into the mold furthermore often entails laborious or expensive design steps. Again the peripheral sealing ring enlarges rather significantly the outside diameter of the filter which as a rule is between one and five cm, and thereby the manufacturer once more incurs additional packing and storage costs which are always critical with mass produced items.

In the light of that state of the art, it is the object of the present invention to create a disposable, i.e. single-use filter holder of the initially cited kind which can be manufactured economically and for which the sealing and locking functions on one hand and the characterization on the other are separate and which makes possible reliable, permanent color-coding of the disposable-filter holder without the deposition of the color code means entailing an increase in the outside dimensions of the disposable-filter holder.

DISCLOSURE OF THE INVENTION

Accordingly the disposable-filter holder of the present inveniton is characterized that there extends in at least one clearance in the first and/or in the second housing piece in geometrically-locking manner and does not project beyond the outer contour of the housing pieces. The color coding no longer serves to close and seal, rather it solely assures reliable individuality, i.e. characterization of the filter type. In other words, the functions of locking and sealing on one hand and on the other of coding are entirely separate in the present invention. The locking of the two housing halves in gas, liquid and pressure-tight manner is achieved by merely a non-positive connection in the zone of two essentially annular axial surfaces at the mutually facing end faces of the housing pieces. This connection illustratively may be by bonding. Preferably however the connection shall be performed in known manner by ultrasonic fusion, which offers good automation of joining and simultaneously lower manufacturing costs with satisfactory tightness.

The color coding means is deposited only after the two-piece housing of the disposable-filter holder is closed. Preferably this deposition is by injection molding. A preferably multi-nested mold is placed in the closed housing and thereupon the clearance(s) in the housing will be injected with a plastic, preferably a thermoplastic dyed according to the filter features, that is according to model series. Because the color coding is solely used for characterization, the thickness and therefore the volume of the injected can be minimized, providing on one hand substantial savings of material and on the other shortened filling time of the mold and anyway improved mold filling. Moreover, keeping the size of the injection mold constant, more mold nests in the mold may be filled simultaneously relative to the maximum volume of material per injection, whereby significant increase in capacity is achieved, or alternatively, an injection mold of lesser capacity may be used. These improvements are especially significant in mass-produced articles. Furthermore, no particular requirements need be set on the quality of the injected color coding means in relation to operational reliablity of the disposable-filter holder, and thereby the reject rate is much reduced.

The volume of the color coding means is reduced further because it is not required to engage around both housing pieces in geometrically locking, essentially U-shaped manner to assure reliable closure. In particular as regards constant filter geometry and thereby constant transmission and filter characteristics, the diameter of the total disposable-filter holder can be kept smaller without thereby reducing the annular axial zones necessary for tight locking. In other words, the dimensions of the disposable-filter holder, especially the diameter and the axial thickness of the flat, boxy filtering zone, will not be enlarged by the injected color coding means.

In a preferred embodiment mode of the invention, the annular clearance receiving the color coding means is located in the outer surface of the disposable-filter holder. The clearance may be present in equal parts in the two housing pieces, or it may be asymmetrically located in only one of them. This embodiment mode shall be especially advantageous if the surface shall always be clearly visible in the packed state and in the operation of the disposable-filter holder.

In another preferred embodiment mode of the invention, the clearance receiving the color coding means extends in offset manner in the radially outer rim zone of the axially outward end surface of at least one of the two housing pieces. Preferably however the color coding means shall be mounted in corresponding, offset clearances in both housing pieces. This embodiment makes possible reliable detection of the type of filter, foremost from above and from below relative to the axial direction of the disposable-filter holder.

Preferably both housing pieces consist of an at least essentially transparent plastic and again preferably are made by injection molding. Appropriately the color coding means consists essentially of a dyed-in, opaque plastic.

BRIEF DESCRIPTION OF THE DRAWINGS

The invention is elucidated below in relation to two illustrative embodiments shown in the drawing.

BEST MODE FOR CARRYING OUT THE INVENTION

Figure 1:
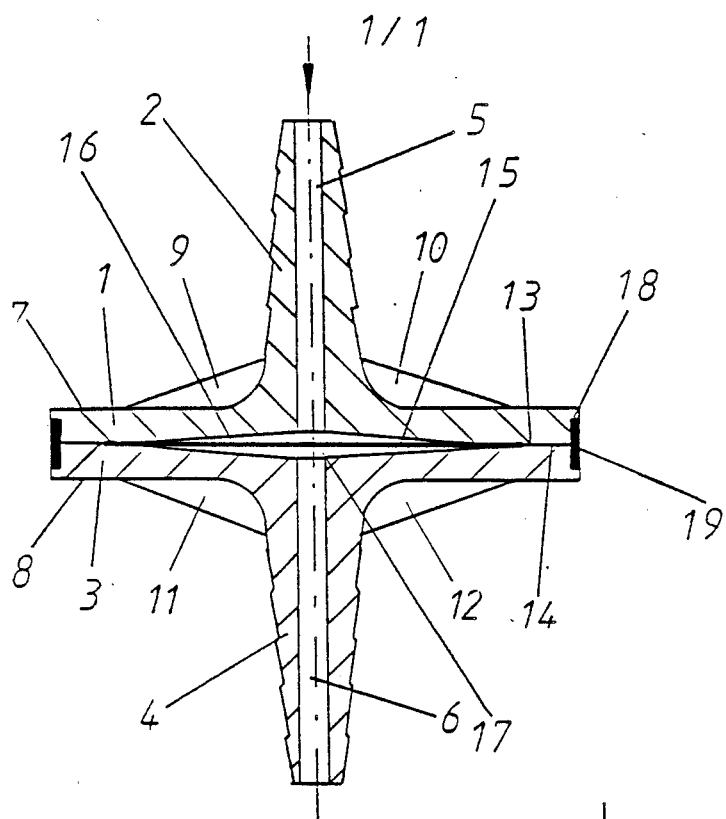
FIG. 1 is a schematic axial section of a first embodiment mode of a disposable-filter holder of the invention, and FIG. 2 also is an axial section of a partly shown second embodiment mode of a disposable-filter holder of the invention.

The disposable-filter holder of the first embodiment of the invention shown in FIG. 1 consists of a first and essentially disk-shaped housing piece 1 with an intake stub 2 and of a second, also disk-shaped housing piece 3 with a discharge stub 4. The intake stub 2 and the discharges tub 4 are essentially shaped as tubular snouts and each is provided with a continuous bore 5, 6 aligned with each other.

The disk-shaped zones 7 and 8 of the disposable-filter holder comprise support ribs 9, 10, 11, 12 radially pointing in the direction of the hook-up stubs 2, 4 in order to prevent the relatively thin hook-up stubs 2, 4 from breaking off when (omitted) hook-up hoses are being connected.

The mutually facing axial surfaces of the two housing pieces 1, 3 comprise radially external circular axial surfaces 13, 14 parallel to each other. With insertion of a membrane-type filter 15, the two housing pieces 1, 3 are joined to each other at those two circular axial surfaces 13, 14 by ultrasonic welding so as to be gas-, liquid-tight and pressure-resistant. The radially inner zones of the axial surfaces are domed in saucer-like manner and thereby determine an essentially lens-shaped cavity divided by the membrane-type filter 15 into a pressure chamber 16 and a filtrate chamber 17. The direction of filtering is denoted by an arrow in FIG. 1.

The disposable-filter holder of FIG. 1 comprises a clearance 18 enclosing this disposable-filter holder in the manner of a circular groove and closed on itself. This clearance 18 is radially very shallow, so that the connection surfaces 13, 14 are reduced only trivially. A color coding means 19 extends through the clearance 18 in geometrically locking manner, that is, it does not project above the geometric envelope of the disposable-filter holder. Thereby the diameter of the total housing shall never be enlarged by the coding.

Figure 2:
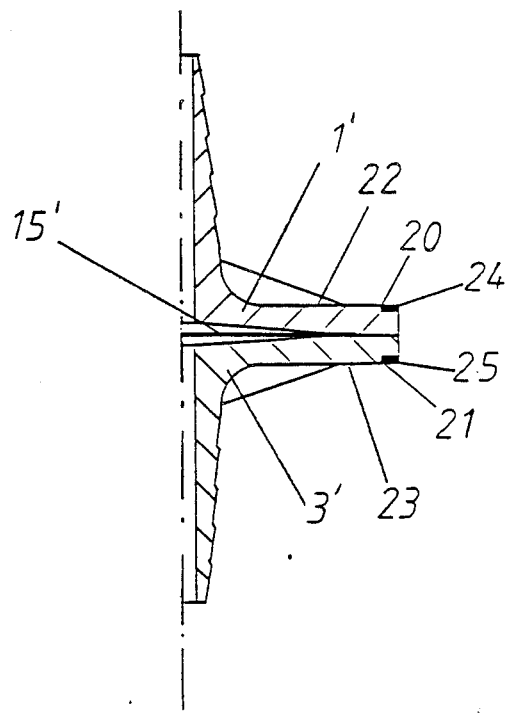

FIG. 2 is a partial second embodiment mode of a disposable-filter holder of the present invention. Structurally this embodiment widely matches the above first described embodiment mode. However, this disposable-filter holder instead of the circular, groovy clearance 18 here comprises at both housing pieces 1' and 3' an offset-type clearance 20, 21 each present at the radially external rim of the axially outward end surfaces 22, 23 of the housing pieces 1' and 3'.

The color coding means, which in this instance consists of two separate colored elastomer rings 24, 25, extends in these offset clearances 20, 21. In this embodiment too the elastomer rings are held in geometrically locking manner, that is, they project neither axially not radially beyond the outside contour of the housing of the disposable-filter holder.

We claim:

1. A plastic, color-coded disposable-filter holder, comprising a first disk-like housing piece with an intake stub and a second disk-like housing piece with a discharge stub, a disk-shaped filter sandwiched between the two housing pieces which are joined together at their radially outer rim zones by their mutually facing axial surfaces in rigid, leak-proof and pressure-resistant manner, further comprising a plastic color coding means enveloping the disposable filter holder at a periphery of the disk-like housing pieces for identifying a structural characteristic of the filter, wherein the color coding means (19;24,25) extends throughout at least one clearance (18;20,21) in at least one of the first housing piece (1;1') and the second housing piece (3;3') without projecting beyond the outer contour of the housing pieces (1,3;1',3').

2. Color-coded disposable-filter holder defined in claim 1, wherein said at least one clearance (18) is essentially a circular groove in the outer geometric envelope of the disposable-filter holder.

3. Color-coded disposable-filter holder defined in claim 1, wherein an axially outward pointing end face is formed in said radially outer rim zone of at least one of the two housing pieces (1',3').

4. Color-coded disposable-filter holder defined in claim 1, wherein the housing pieces (1,3;1',3') are essentially transparent plastic and the color coding means is a dyed-in, opaque plastic.

5. Color-coded disposable-filter holder defined in claim 1, wherein the color coding means (19;24,25) is an injection molded plastic in the clearance (18) or clearances (20,21).

6. The filter holder of claim 1, wherein the structural characteristics of the filter identified by the plastic color coding means is indicative of at least one of filter material, pore size, and sterility.

7. The filter of claim 1, wherein said plastic color coding means is utilized solely for characterization of a structural characteristic of the filter without providing any seal between the first and second housing pieces.

* * * * *